US010031605B2

(12) United States Patent
Alonso et al.

(10) Patent No.: US 10,031,605 B2
(45) Date of Patent: Jul. 24, 2018

(54) DISPLAY INTEGRATED PRESSURE SENSOR

(71) Applicant: Microsoft Technology Licensing, LLC, Redmond, WA (US)

(72) Inventors: Vicente Calvo Alonso, Piispanristi (FI); Oiva Sahlsten, Salo (FI); Jouko Lang, Lieto (FI); Kenneth Majander, Turku (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/684,839

(22) Filed: Apr. 13, 2015

(65) Prior Publication Data
US 2016/0299613 A1    Oct. 13, 2016

(51) Int. Cl.
*G06F 3/041* (2006.01)
*G06F 1/16* (2006.01)

(52) U.S. Cl.
CPC .......... *G06F 3/0414* (2013.01); *G06F 1/1652* (2013.01); *G06F 3/0412* (2013.01); *G06F 2203/04102* (2013.01); *G06F 2203/04103* (2013.01); *G06F 2203/04105* (2013.01)

(58) Field of Classification Search
USPC ................................................. 345/173–174
See application file for complete search history.

(56) References Cited

U.S. PATENT DOCUMENTS

| 5,010,774 A | 4/1991 | Kikuo et al. |
| 8,436,819 B2 | 5/2013 | Huang et al. |
| 8,711,292 B2 | 4/2014 | Guard et al. |
| 2004/0183958 A1 | 9/2004 | Akiyama et al. |
| 2006/0209039 A1* | 9/2006 | Destura ................. G06F 3/0412 345/173 |
| 2008/0158171 A1 | 7/2008 | Wong et al. |

(Continued)

FOREIGN PATENT DOCUMENTS

| CN | 103777399 A | 5/2014 |
| WO | 2004066067 A2 | 8/2004 |

(Continued)

OTHER PUBLICATIONS

"Introduce use of the touch panels which Makes our life more Comfortable", Published on: Oct. 5, 2013 Available at: http://www.nissha.com/english/products/dev/input/develop.html.

(Continued)

*Primary Examiner* — Jennifer Mehmood
*Assistant Examiner* — Deeprose Subedi

(57) ABSTRACT

A display integrated pressure sensor is described. In an example, a device comprises: a display including a plurality of layers; a layer of pressure sensitive material having particles; conductivity of the pressure sensitive material is configured to change when the layer experiences deformation; a layer of conductor lines configured to detect the change of the conductivity of the pressure sensitive material; the layer of conductor lines includes a plurality of contacting points with the pressure sensitive material; the layer of pressure sensitive material and the conductor lines are configured to be integrated within the display. In other examples, a manufacturing method and a display module are discussed along with the features of the device.

20 Claims, 21 Drawing Sheets

(56) References Cited

U.S. PATENT DOCUMENTS

| | | | |
|---|---|---|---|
| 2010/0053721 A1 | 3/2010 | Chwu et al. | |
| 2010/0171708 A1 | 7/2010 | Chuang | |
| 2011/0141052 A1* | 6/2011 | Bernstein | G06F 3/016 345/174 |
| 2011/0241063 A1 | 10/2011 | Winscom | |
| 2011/0269075 A1 | 11/2011 | Wang et al. | |
| 2012/0034451 A1 | 2/2012 | Seo et al. | |
| 2012/0242588 A1 | 9/2012 | Myers et al. | |
| 2012/0313860 A1* | 12/2012 | Hashimura | B82Y 15/00 345/173 |
| 2013/0044384 A1* | 2/2013 | Kim | B05D 5/06 359/885 |
| 2013/0083496 A1 | 4/2013 | Franklin et al. | |
| 2013/0181726 A1* | 7/2013 | Viallet | G01L 1/146 324/652 |
| 2013/0265221 A1 | 10/2013 | Lee et al. | |
| 2013/0265280 A1 | 10/2013 | Burns et al. | |
| 2013/0278542 A1 | 10/2013 | Stephanou et al. | |
| 2013/0328792 A1 | 12/2013 | Myers et al. | |
| 2013/0335376 A1* | 12/2013 | Lee | G06F 3/0416 345/174 |
| 2014/0008203 A1 | 1/2014 | Nathan et al. | |
| 2014/0035830 A1* | 2/2014 | Wei | G06F 3/0414 345/173 |
| 2014/0049500 A1 | 2/2014 | Chen et al. | |
| 2014/0168139 A1 | 6/2014 | Ku | |
| 2014/0204285 A1 | 7/2014 | Jang | |
| 2014/0295150 A1 | 10/2014 | Bower et al. | |
| 2015/0062101 A1 | 3/2015 | Kim et al. | |
| 2015/0242037 A1* | 8/2015 | Pedder | G01L 1/18 345/173 |
| 2015/0346881 A1* | 12/2015 | Watazu | G01L 1/16 345/174 |
| 2016/0048266 A1* | 2/2016 | Smith | G06F 3/0418 345/174 |
| 2016/0092015 A1* | 3/2016 | Al-Dahle | G06F 3/044 345/174 |
| 2016/0098109 A1* | 4/2016 | Choi | G06F 3/044 345/174 |
| 2016/0342257 A1* | 11/2016 | Watazu | G06F 3/0414 |

FOREIGN PATENT DOCUMENTS

| | | |
|---|---|---|
| WO | 2007107522 A1 | 9/2007 |
| WO | 2014043325 A1 | 3/2014 |
| WO | 2014126403 A1 | 8/2014 |

OTHER PUBLICATIONS

"International Search Report and Written Opinion Issued in PCT Application No. PCT/US2016/024599", dated Aug. 26, 2016, 20 Pages.

"Second Written Opinion Received for PCT Application No. PCT/US2016/024599", dated Jan. 20, 2017, 8 Pages.

"International Preliminary Report on Patentability Issued in PCT Application No. PCT/US2016/024599", dated Jul. 21, 2017, 9 Pages.

* cited by examiner

DISPLAY INTEGRATED PRESSURE SENSOR

BACKGROUND

A gesture sensitive panel is an input device, which allows a user to input a command to a computing device by selecting the indication content displayed on a screen of an image display device by using his or her fingers or other objects or gestures. A gesture here generally refers to physical interaction between a human or other objects and the touch sensitive panel. An example of the gesture is a touch on a touch sensitive panel.

In addition, a flexible image display device is recently being developed. In this case, the touch screen panel attached onto the flexible image display device is required to have a flexible characteristic. Current progress in flexible displays technologies is making new device formats to appear, for example rollable displays, bendable open-close display lids, and foldable displays.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A display integrated pressure sensor is described. In an example, a device comprises: a display including a plurality of layers; a layer of pressure sensitive material having particles; conductivity of the pressure sensitive material is configured to change when the layer experiences deformation; a layer of conductor lines configured to detect the change of the conductivity of the pressure sensitive material; the layer of conductor lines includes a plurality of contacting points with the pressure sensitive material; the layer of pressure sensitive material and the conductor lines are configured to be integrated within the display.

In other examples, a manufacturing method and a display module are discussed along with the features of the device.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although the present examples may be described and illustrated herein as being implemented in a smartphone or a mobile phone, these are only examples of mobile devices and not a limitation. As those skilled in the art will appreciate, the present examples are suitable for application in a variety of different types of mobile devices, for example in tablets, phablets, portable computers, lap tops, cameras, and wearable devices.

Figure 1:
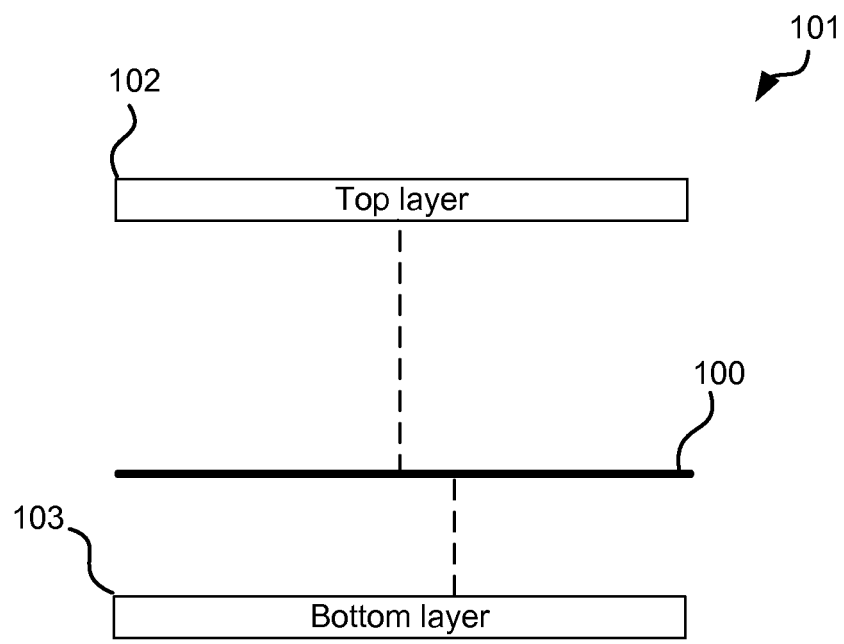
FIG. 1 illustrates a cross section of a schematic representation of a bendable display device according to an illustrative example.

FIG. 1 illustrates an example of a bendable display device 101 including a pressure sensor 100. The bendable display device 101 includes layers, which are configured to establish a display unit and the pressure sensor 100. The layers include a top layer 102 and a bottom layer 103. Layers establishing the pressure sensor are integrated within the bendable display device 100. Consequently, the layers of the pressure sensor 100 are between the top and the bottom layers, and integrated inside these layers within the bendable display device 101.

According to an example, the bendable display device 101 may be foldable. According to another example, the bendable display device 101 may be flexible. The bendable display device 101 is subject to deformation. For example, substantial deformation may take place in the device 101 so that the degree of deformation is typically more than the nominal deformation of any non-bendable material. For example, hard plastic may be subject to very small non-bendable material flexibility, when it is pressed. However, it is not subject to deformation. For example, even the slightest bending may break hard plastics.

According to an example, a pressure sensor 100 is used to replace a conventional capacitive touch sensor, and the pressure sensor 100 is integrated inside the bendable display device 101. The pressure sensor 100 may not need separation between the sensor and a finger; consequently, the thickness of the stack of the layers may be reduced. The pressure sensor 100 is integrated into the bendable display device 101 by depositing layers of the pressure sensor 100 inside the device 101, when the bendable display device 101 is manufactured. A layer of pressure sensitive material having particles is deposited between the top and the bottom layer. Conductivity of the pressure sensitive material is configured to change when the layer experiences deformation. A layer of conductor lines is deposited next to the layer of ink material. The layer of conductor lines is configured to detect the change of the conductivity of the pressure sensitive material. The layer of conductor lines is next to the layer of pressure sensitive material so that it includes a plurality of contacting points with the pressure sensitive material.

In an example, the height of the bendable display device 100, for example the stack of the layers, may be relatively thin. Furthermore, when laminated layers or any adhesives can be reduced, the bendability or flexibility of the stack increases. Relatively good mechanical behavior may be achieved. A risk of delamination may decrease, for example because of a relatively thin construction. The integrated pressure sensor 100 does not require a minimum distance between the sensor and the finger to operate properly as required, for instance in, in capacitive touch sensors. The layers of pressure sensitive material and conductor lines enable a bendable display technology for integrated touch sensors.

Figure 2:
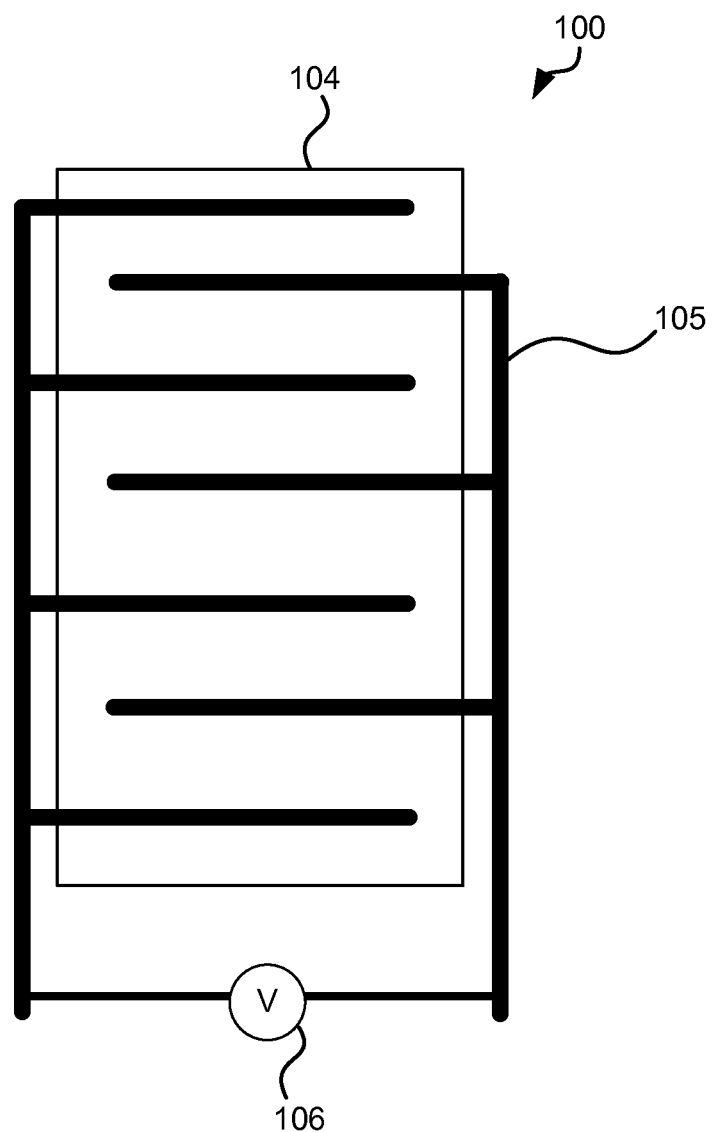
FIG. 2 illustrates a schematic representation of a pressure sensor in accordance with an illustrative example.

FIG. 2 illustrates an example of a pressure sensor 100. The pressure sensor 100 includes a layer of pressure sensitive material 104 and a layer of conductor lines 105. Conductivity of the pressure sensitive material 104 is configured to change, when the layer 104 experiences deformation. A layer of conductor lines 105 is deposited next to the layer of pressure sensitive material. The layer of conductor lines 105 is configured to detect the change of the conductivity of the pressure sensitive material 104. The layer of conductor lines 105 is next to the layer of pressures sensitive material 104 so that it includes a plurality of contacting points with the pressure sensitive material 104. Each contacting point may detect the deformation of the pressure sensitive material 104. The sensor 100 includes a detector 106, which is configured to detect the conductivity change in the pressure sensitive material 104, which is conveyed to the detector via the conductor lines 105. An example of FIG. 2 illustrates two conductor lines 105 with the pressure sensitive material 104 in between; however, it should be noted that the number of conductor lines 105 may vary. The shape of the conductor lines 105 and the pressure sensitive material 104 may also vary, and a rectangular shape is merely an example as shown in FIG. 2.

The pressure sensitive material 104 may, for example, include functionalized nanoparticles 112, which exhibit an exponential conductivity response versus an applied force 113. These particles can be, but are not limited to, metallic nanoparticles or semiconductor metal oxide nanoparticles functionalized with appropriate ligand molecules. Such materials allow a very sensitive pressure sensor 104 to be fabricated. More generally, other pressure sensitive materials may be used, such as pressure sensitive polymer materials e.g. electroactive polymers and materials which exhibit piezoelectric response.

Figure 3:
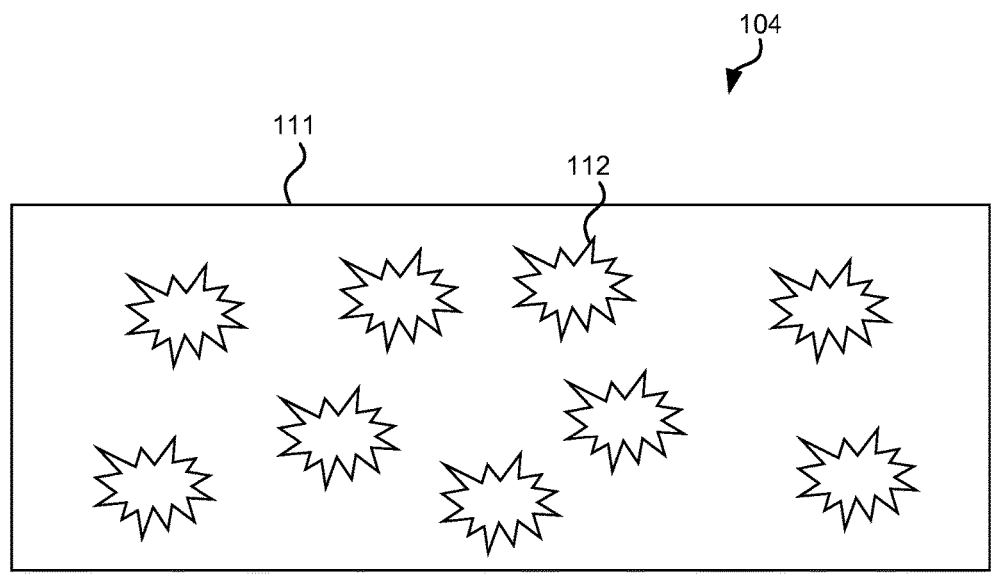
FIG. 3 illustrates a schematic representation of a pressure sensitive material with particles in accordance with an illustrative example.

FIG. 3 is an illustrative example of pressure sensitive material 104 comprising nanoparticles 112. The pressure sensitive material 104 includes functionalized nanoparticles 112, which are materials composed of, for example, metallic and/or semiconductor nanoparticles embedded in a polymer matrix 111. The nanoparticles 112 can be functionalized with appropriate ligand molecules to enhance quantum mechanical (QM) tunneling between the nanoparticles 112. In a non-deformation state, for example the normal resting state, such material 104 acts like a near-perfect electrical insulator. The size of the nanoparticles 112 can range from a few nanometers to hundreds of nanometers and their morphology can be sharp nanostructured "tips" or very high aspect ratio particles.

Figure 4:
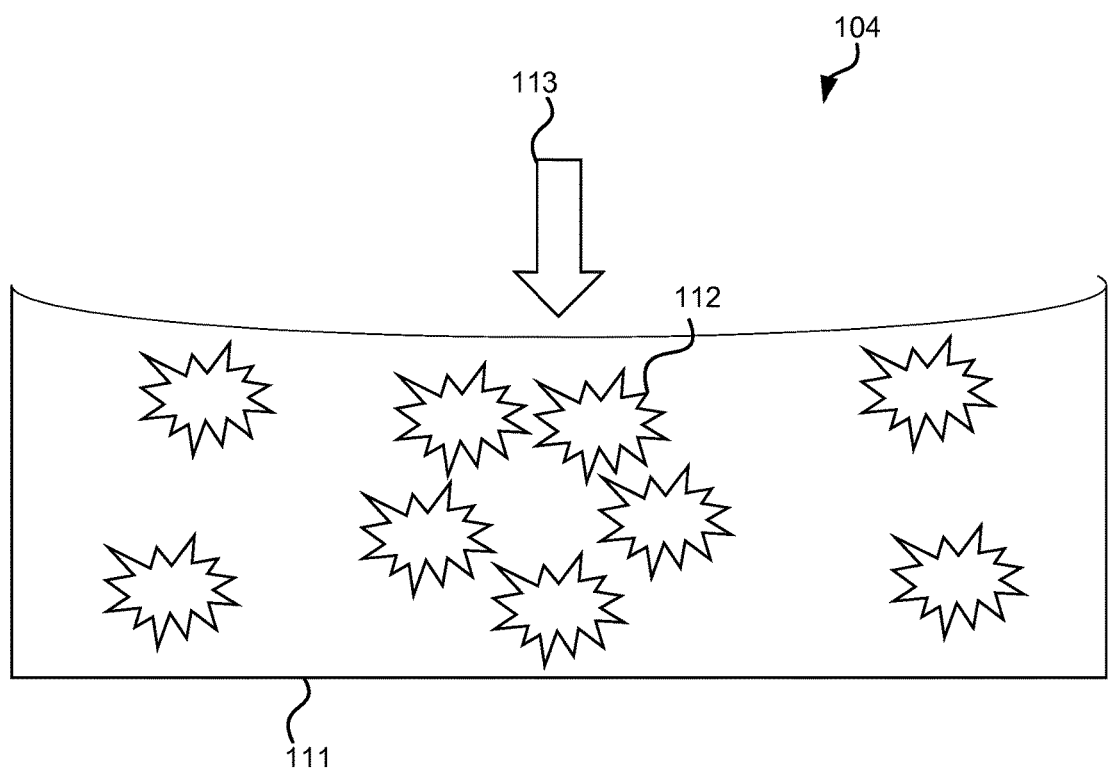
FIG. 4 illustrates a schematic representation of a pressure sensitive material with particles in accordance with another example.

FIG. 4 illustrates an example of pressure sensitive material 104 under deformation. When the pressure sensitive material 104 is deformed, for example when a force 113, such as pressure, is applied, mechanical deformation induces reduction of the polymer thickness among the conducting or semiconducting nanoparticles 112. Subsequently, the distance between the functionalized nanoparticles 112 is reduced and the overall conductivity within the pressure sensitive material 104 is enhanced. An example of the reason of the conductance increase is the quantum mechanical (QM) tunneling of the electrons from a nanoparticle to a neighboring nanoparticle via ligand molecules. More precisely, for example the compression reduces the distance between the particles 112 and consequently the width of the potential barrier and thus enhancing electron tunneling probability and allowing electrons to conduct electricity within the material.

Classically, the electron cannot penetrate into or across a potential barrier if its kinetic energy is smaller than the height of the potential barrier. According to quantum mechanics, an electron has a finite probability density inside and/or on the other side of the potential barrier even though the kinetic energy is lower than the height of the barrier. Thus, the electron can experience a phenomenon called quantum mechanical tunneling through the barrier. The inherent reason lies in the wave-particle duality and the Heisenberg uncertainty relation of quantum mechanics.

The criteria for the QM tunneling are: 1) wavefunction overlapping between the conductors/semiconductors, and thus a small distance between the nanoparticles; 2) availability of the density of electronic states for the tunneling electrons to occupy; 3) fermi-level disparity across the potential barrier, and thus a potential difference, for example a voltage, is needed. The resultant tunneling current is exponentially dependent on the distance between the conducting or semiconducting nanoparticles 112.

Taking into account the tunneling phenomena, in functionalized nanoparticle 112 materials 104 the conduction and the resistance of the film is exponentially dependent on the width of the potential barrier, and thus the distance between the particles 112.

The application of a force 113 would reduce the inter-particle separation, and the tunneling probability is increased. Even very small deformation may be enough for generating a conducting tunneling path. Consequently, a very sensitive sensor 104 may be made.

Examples of FIGS. 5-15 illustrate an example of integrating the pressure sensor 100 into the bendable display device 101. These examples relate to a color filter substrate. The examples relate to the implementation of the pressure sensor 100 utilizing a color filter structure, benefiting from the existing shapes or patterns of the color filter structure and the manufacturing processes of the color filter. By implementing the pressure sensor 100 in the color filter structure, the stack thickness of the bendable display device 101 may be reduced and the flexibility may be enhanced.

Figure 5:
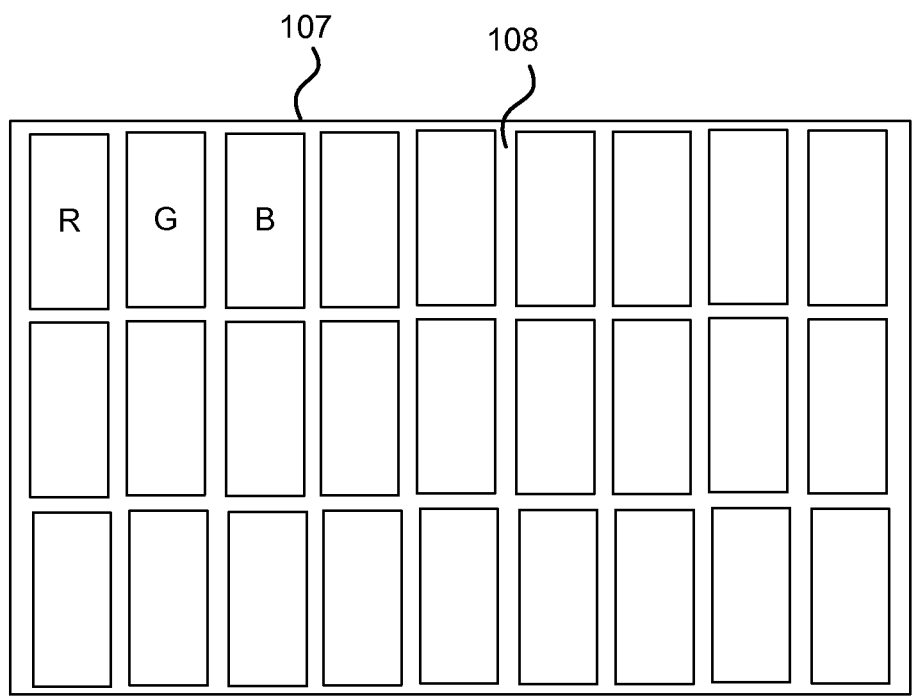
FIG. 5 illustrates a schematic representation of a structure of a color filter.

FIG. 5 illustrates an example of a structure of a layer of a color filter 107. The color filter 107 includes red R, green G, and blue B filters for filtering white organic light emitting diodes (OLEDs). The color filter 107 includes a black matrix, which is configured between the R, G, and B filters. The color filter 107 may be a layer of the bendable display device 101.

Figure 6:
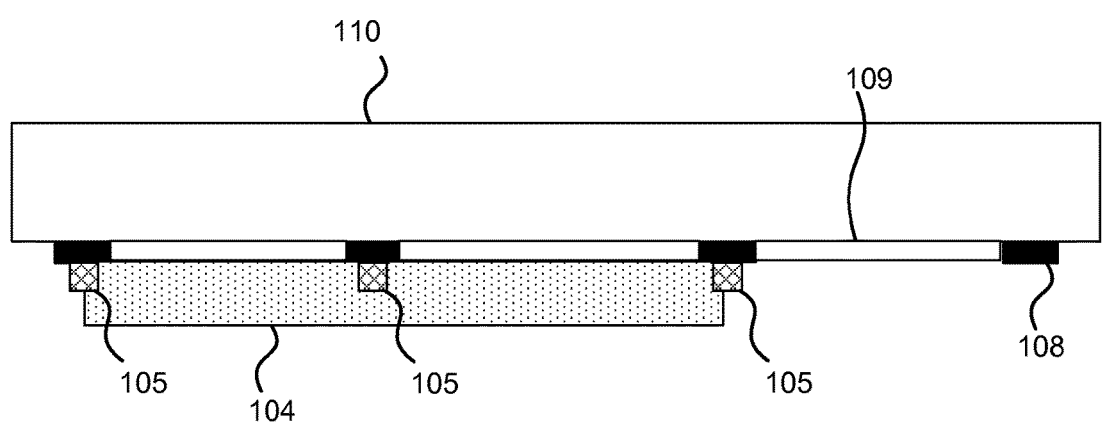
FIG. 6 illustrates a cross section of a schematic representation of a structure of a pressure sensor integrated in a color filter in accordance with an illustrative example.
Figure 7:
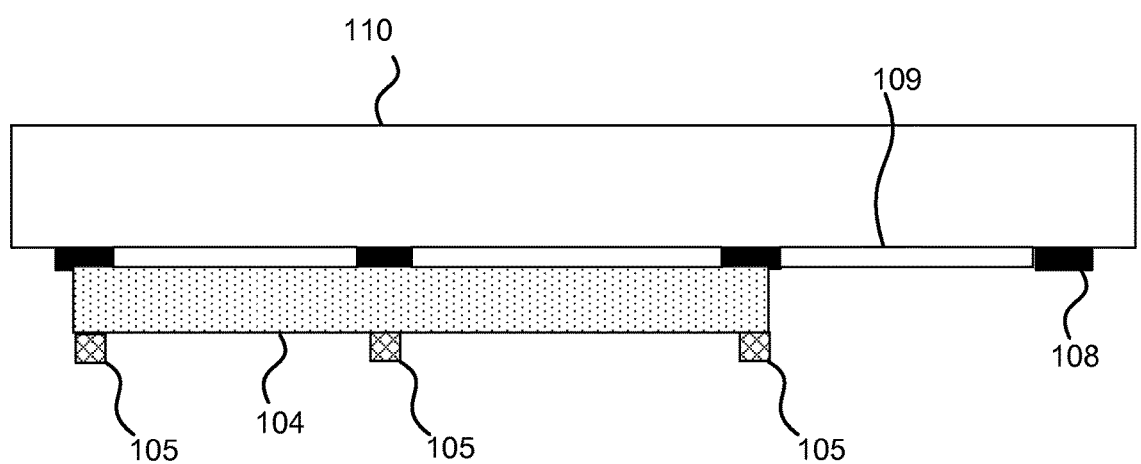
FIG. 7 illustrates a cross section of a schematic representation of a structure of a pressure sensor integrated in a color filter in accordance with another example.

FIG. 6 and FIG. 7 illustrate examples of integrating a pressure sensor 100 into a color filter 107. Conductor lines 105 can be deposited on top of the black matrix 108. For example, the conductor lines 105 are configured to conform to the shape and design of the black matrix 108. The conductor lines 105 may be of the same width as the black matrix 108. The conductor lines 105 may be of a smaller width than the black matrix 108. Because the conductor lines 105 conform to the shape of the black matrix 108, there is no limitation on using transparent conductive materials, making it possible to improve the conductivity.

The pressure sensitive material 104 may be placed either on top of the conductor lines as shown in FIG. 7 or under or within them as shown in FIG. 6.

Figure 8:
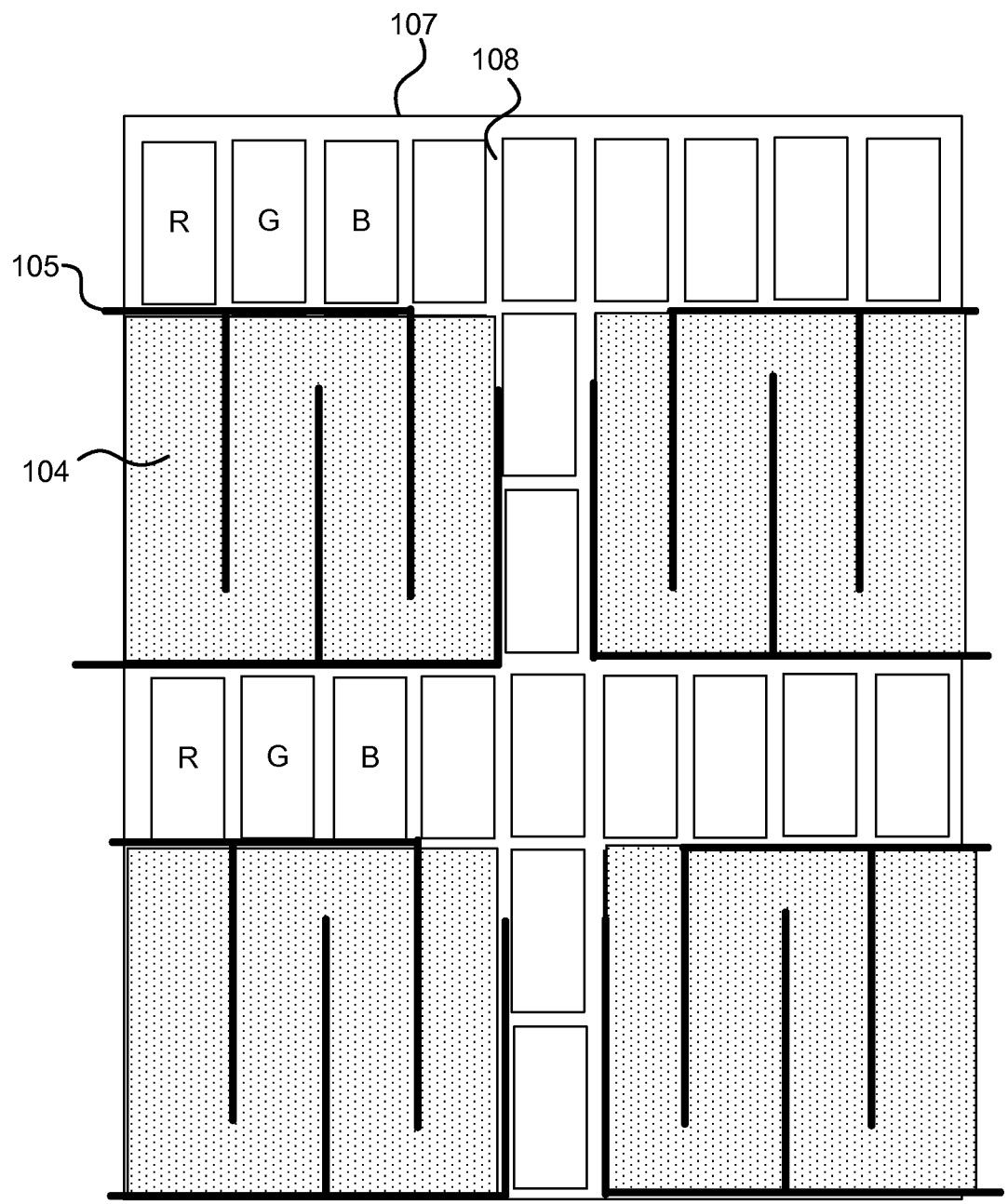
FIG. 8 illustrates a schematic representation of a pressure sensor integrated in a structure of a color filter in accordance with an illustrative example.

FIG. 8 illustrates an example of the structure of the color filter 108 having an integrated pressure sensor 100. In order to avoid visual marks, the areas not used by the pressure sensor 105 could be filled with isolated conductive inks (not shown in FIG. 8). For this process, the same masks may be used to create the pattern for isolation.

Examples of FIGS. 9-15 illustrate manufacturing process overviews. The pressure sensor manufacturing may be incorporated and implemented in the manufacturing process of the color filter 108, for example by photolithography, by adding two further steps: 1) conductor deposition and 2) pressure sensitive material deposition.

Figure 9:
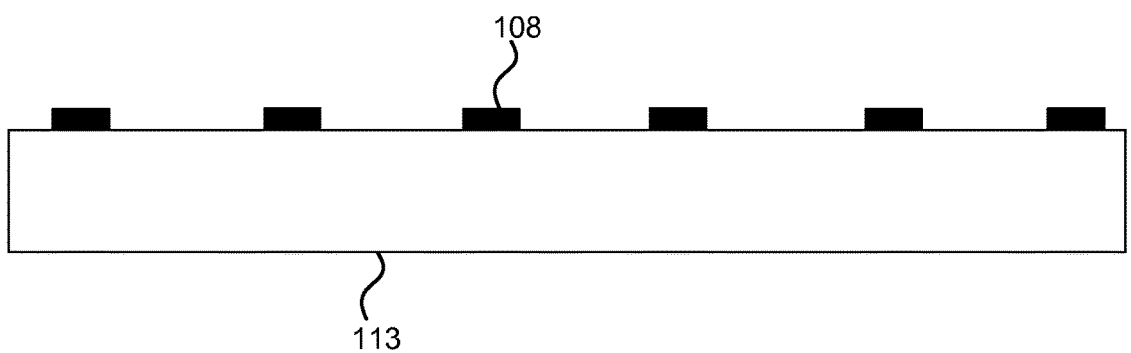
FIG. 9 illustrates an example of a cross section of a schematic representation of a black matrix formation.
Figure 10:
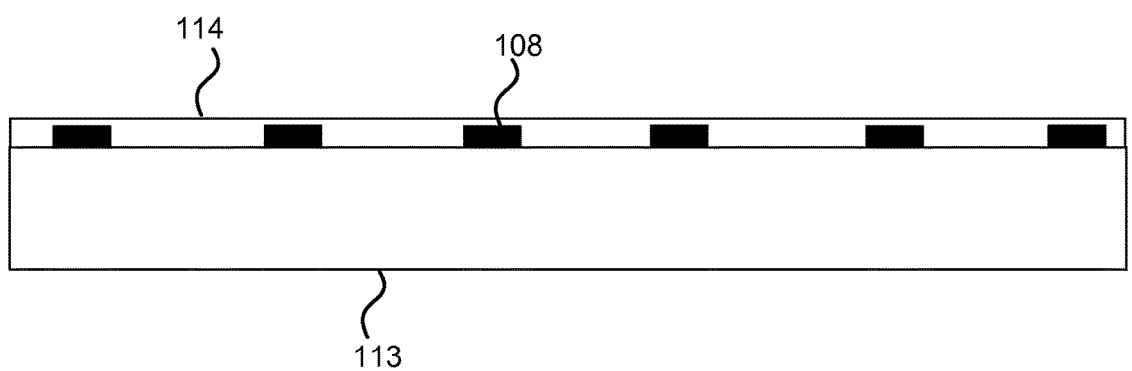
FIG. 10 illustrates a cross section of a schematic representation of a color resist coating in accordance with an illustrative example.
Figure 11:
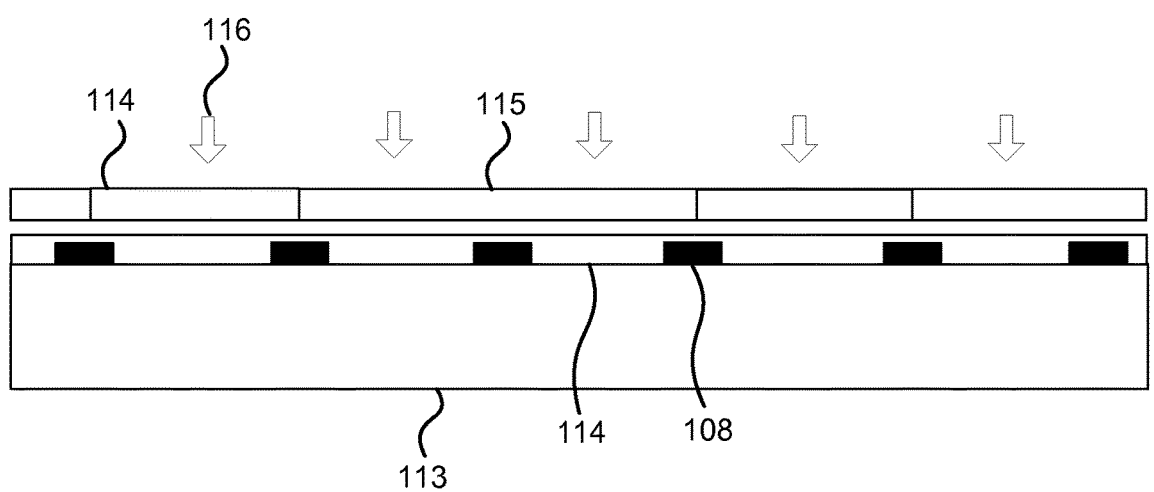
FIG. 11 illustrates a cross section of a schematic representation of exposure in accordance with an illustrative example.
Figure 12:
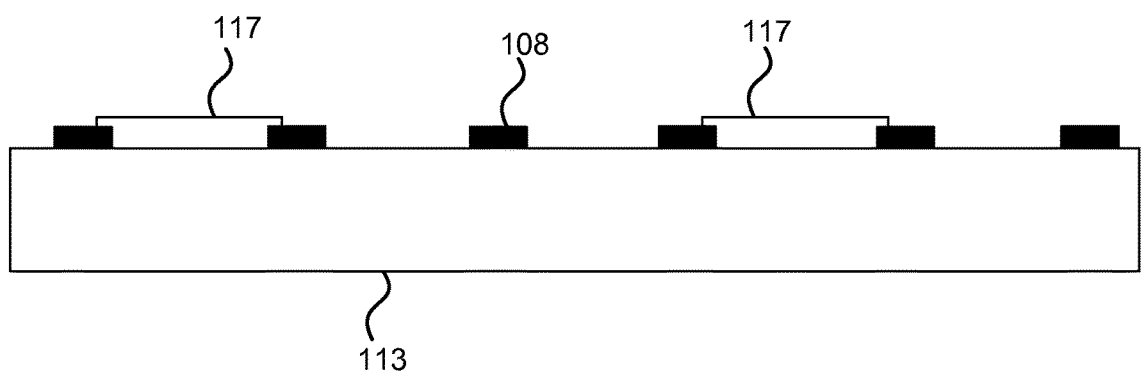
FIG. 12 and FIG. 13 illustrate a cross section of a schematic representation of a development and a baking coating in accordance with an illustrative example.
Figure 13:
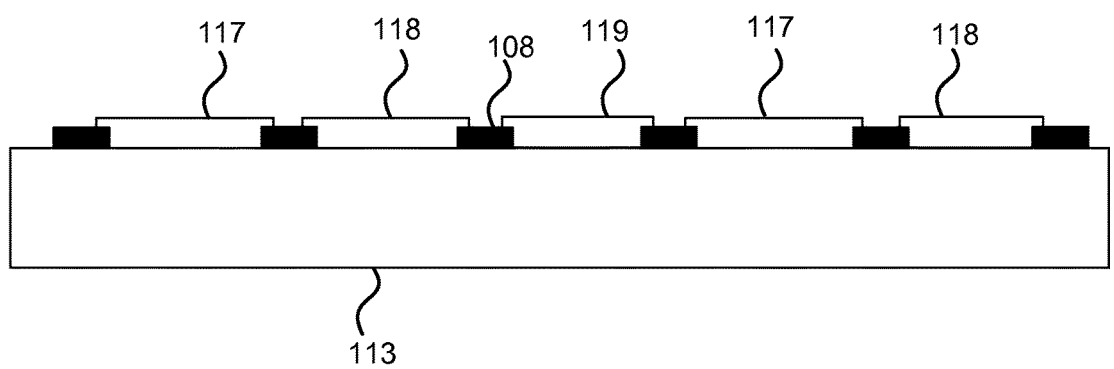
Figure 14:
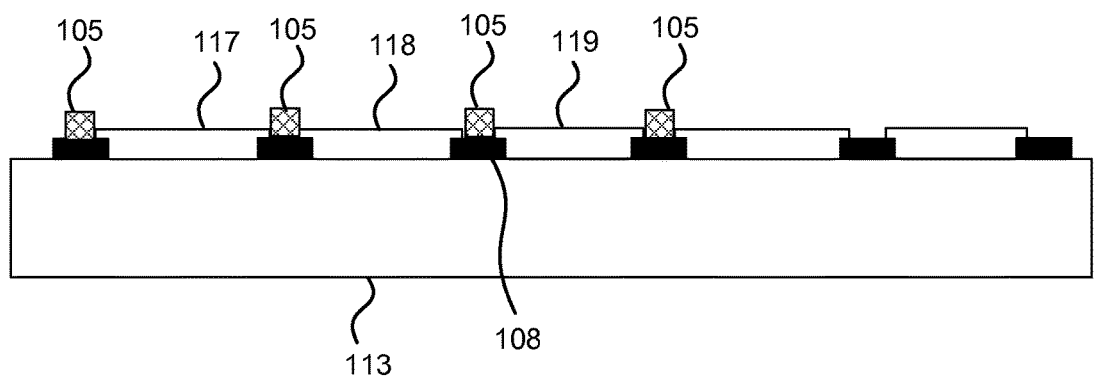
FIG. 14 illustrates a cross section of a schematic representation of conductor printing in accordance with an illustrative example.

FIG. 9 illustrates an example of black matrix 108 formation. A black matrix 108 is formed in order to prevent any leakage of backlight and to prevent the RGB colors from being mixed. The black matrix 108 is shown on a glass substrate 113. FIG. 10 illustrates an example of color resist coating. The color resist 114 is coated on the entire glass substrate surface. FIG. 11 illustrates an example of exposure. To make the pattern insoluble, it is UV cured 116 by exposure through a photomask 114,115. FIG. 12 illustrates an example of development and baking. After the removal of unnecessary portions of the color resist by the development solution, the pattern is cured through baking. A red, R, filter 117 remains in this step. According to the example of FIG. 13, the process of FIG. 12 and FIG. 13 is repeated two times for green, G, 118 and blue, B, 119, respectively. FIG. 14 illustrates an example of making the conductor lines 105.

Figure 15:
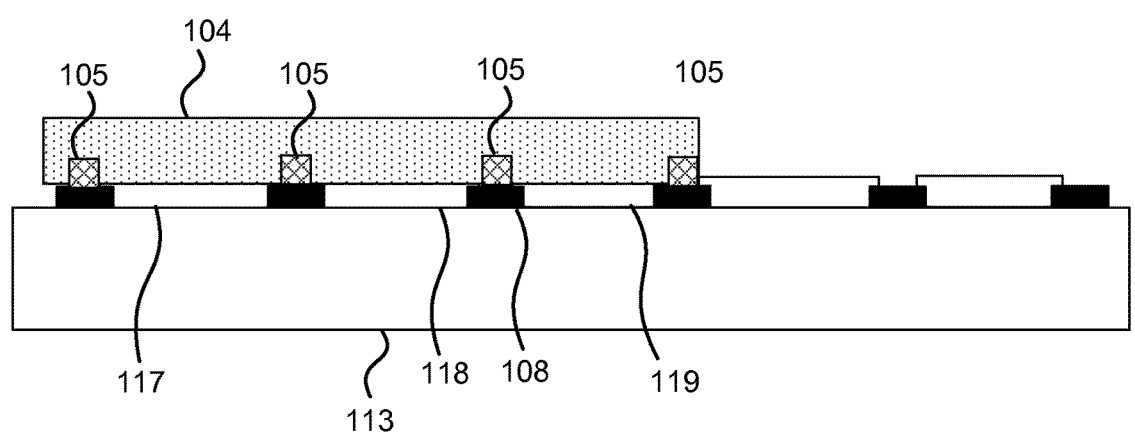
FIG. 15 illustrates a cross section of a schematic representation of pressure sensing material deposition in accordance with an illustrative example.

The conductor lines 105 may be deposited or printed on the black matrix 108. The conductor lines 105 may be printed using an ink to form them on the black matrix 108. FIG. 15 illustrates an example of making the pressure sensitive material 104. The pressure sensitive material 104 may be deposited or printed on the color filter 107.

Figure 16:
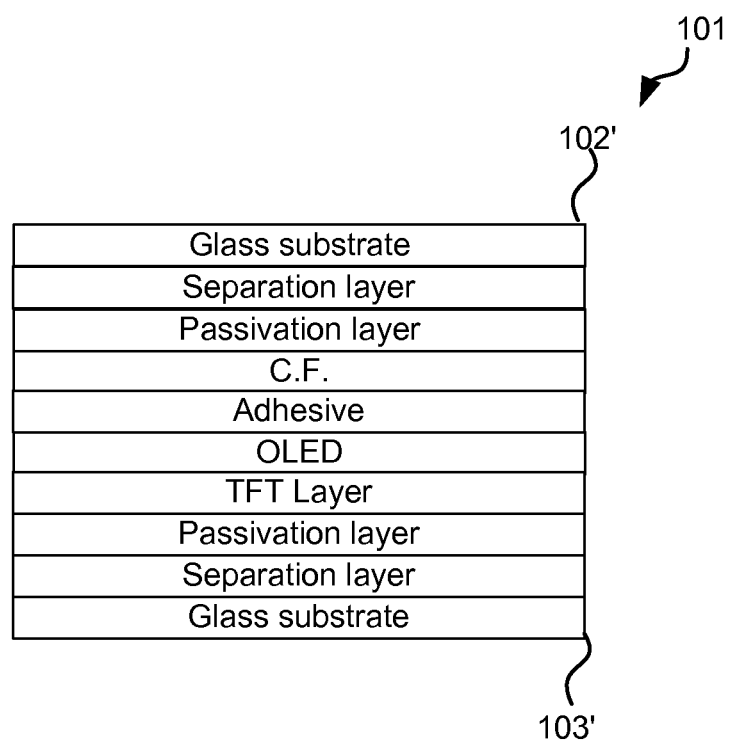
FIG. 16 illustrates a cross section of a schematic representation of layers of a bendable display device manufacturing process in accordance with an illustrative example.
Figure 17:
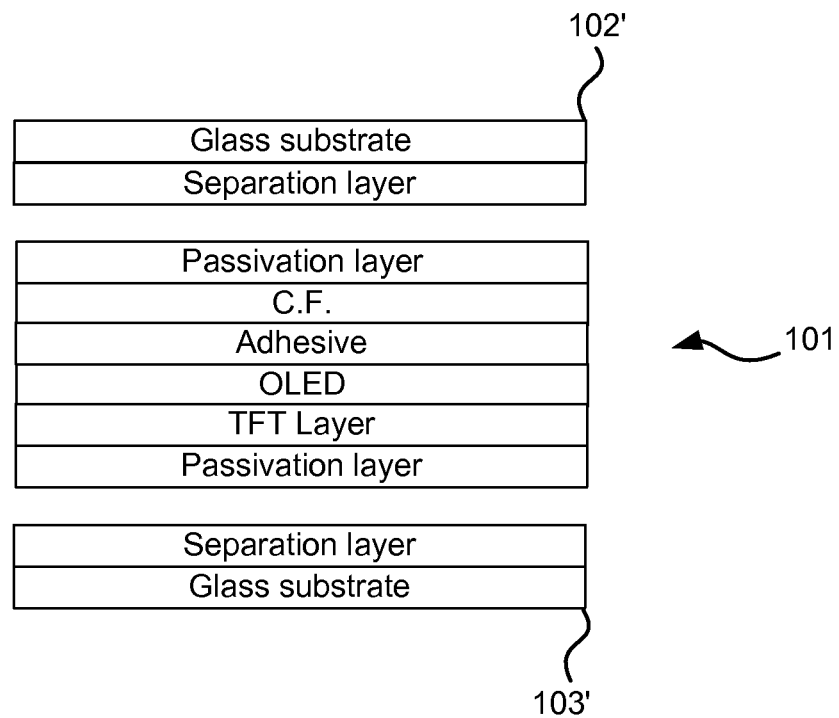
FIG. 17 illustrates a cross section of a schematic representation of layers of a bendable display device manufacturing process in accordance with another example.
Figure 18:
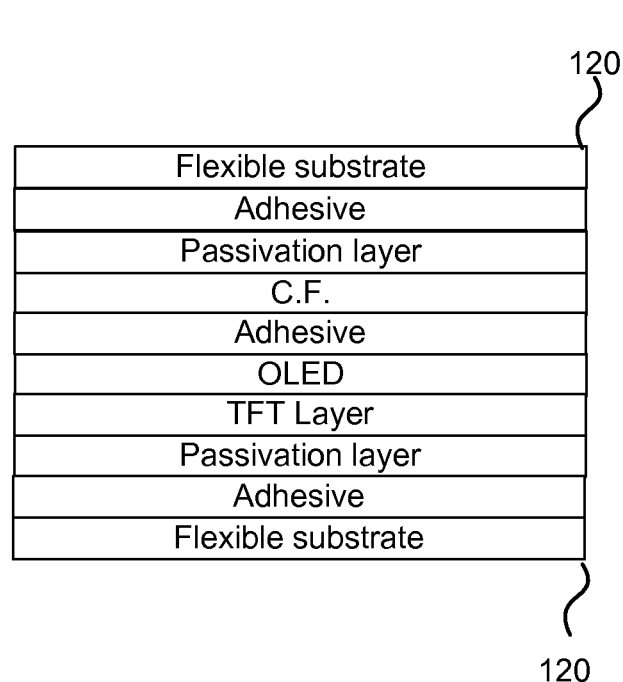
FIG. 18 illustrates a cross section of a schematic representation of layers of a bendable display device manufacturing process in accordance with another example.
Figure 19:
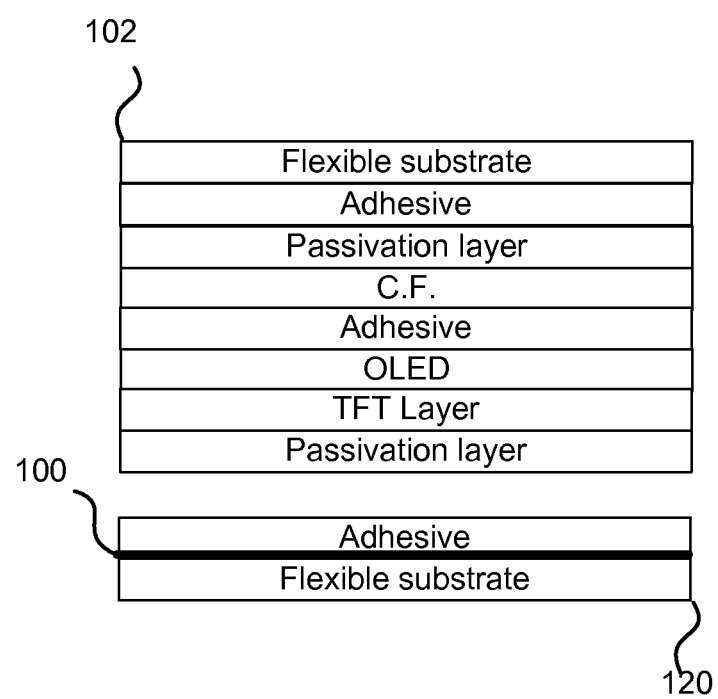
FIG. 19 illustrates a cross section of a schematic representation of layers of a bendable display device manufacturing process in accordance with another example.
Figure 20:
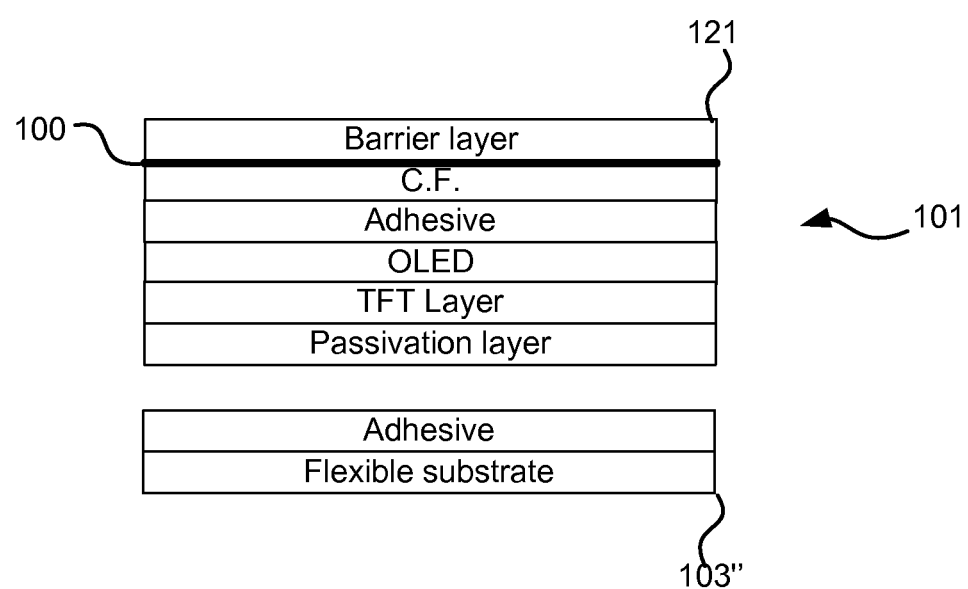
FIG. 20 illustrates a cross section of a schematic representation of layers of a bendable display device manufacturing process according to another example.

FIGS. 16-19 illustrate examples of integrating the pressure sensor 100 in a back substrate of the bending display device 101. Generally, plastic OLEDs are manufactured on a polyimide, PI, thin substrate. Due to the extreme flexibility of the PI substrate, the processing of the thin film transistors, TFT, backplane requires that the PI is attached to a glass substrate 102',103' as shown in FIG. 16. The glass substrate 102',103' is separated, once the backplane process, and/or encapsulation layers, are finalized as shown in FIG. 17. After glass substrate separation of FIG. 17, a plastic substrate 120 may be added in order to protect the backplane as illustrated in FIG. 18. The pressure sensor 101 can be pre-manufactured in the plastic substrate 120 as shown in FIG. 19. Consequently, the pressure sensor 100 may be integrated into the back substrate, when the pre-manufactured plastic substrate 120, with the pressure sensor 100, is attached. FIG. 20 illustrates an example, wherein the pressure sensor 100 may be included in a film barrier 121. The film barrier 121 may be on top of the device 101. In the example of FIG. 20, there is a single glass support, which can be separated and replaced by flexible substrate 103", at the bottom of the display device 101.

While examples have been discussed in the form of a smartphone, as discussed, other bendable computing devices may be used equivalently, such as tablet computers, netbook computers, laptop computers, desktop computers, processor-enabled televisions, personal digital assistants (PDAs), touchscreen devices connected to a video game console or set-top box, or any other computing device that has a bendable display unit and is enabled to apply it.

The term 'computer', 'computing-based device', 'apparatus' or 'mobile apparatus' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

Figure 21:
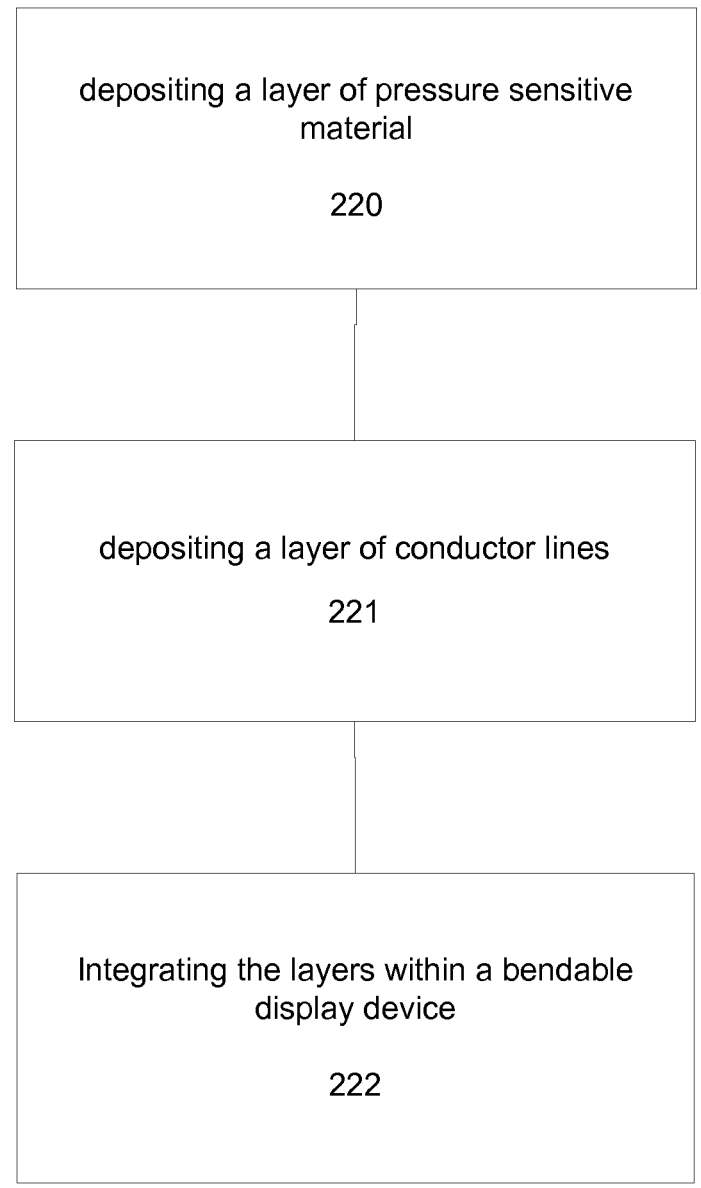
FIG. 21 illustrates an example of a sequence diagram of a method for manufacturing a bendable display device.

FIG. 21 illustrates an example of a manufacturing method for the bendable display device 101. In the step 220 there is being deposited a layer of pressure sensitive material 104 having particles 112, wherein a conductivity of the pressure sensitive material 104 is configured to change, when the layer 104 experiences a deformation. In the step 221 there is being deposited a layer of conductor lines 105 configured to detect the change of the conductivity of the pressure sensitive material 104, wherein the layer of conductor lines 105 includes a plurality of contacting points with the pressure sensitive material 104. In the step 222 the layer of pressure sensitive material 104 and the conductor lines 105 are configured to be integrated within a display unit including a plurality of layers 100, 102, 103, 104, 105. In the step 222 the layer may be, for example, laminated to establish a single bendable display unit structure.

The manufacturing methods and functionalities described herein may be operated by software in machine readable form on a tangible storage medium e.g. in the form of a computer program comprising computer program code means adapted to perform all the functions and the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage medium, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought. Also any example may be combined to another example unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

According to the above, some examples are directed to a device, comprising: a display including a plurality of layers; a layer of pressure sensitive material having particles, wherein a conductivity of the pressure sensitive material is configured to change, when the layer experiences a deformation; and a layer of conductor lines configured to detect the change of the conductivity of the pressure sensitive material, wherein the layer of conductor lines includes a plurality of contacting points with the pressure sensitive material; wherein the layer of pressure sensitive material and the conductor lines are configured to be integrated within the display. Additionally or alternatively to one or more of the examples, the display includes a top layer and a bottom layer, and the layer of the pressure sensitive material and the layer of the conductor lines are laminated between the top and the bottom layer. Additionally or alternatively to one or more of the examples, the conductivity of the pressure sensitive material is configured to increase, when the layer of the pressure sensitive material experiences the deformation. Additionally or alternatively to one or more of the examples, the pressure sensitive material comprises a pressure sensitive ink material. Additionally or alternatively to one or more of the examples, the pressure sensitive material comprises a functionalized nanoparticle material, wherein the particles comprise the nanoparticles and ligand molecules. Additionally or alternatively to one or more of the examples, the pressure sensitive material is configured to be transparent. Additionally or alternatively to one or more of the examples, the particles comprise metallic nanoparticles; or wherein the particles comprise semiconductor nanoparticles. Additionally or alternatively to one or more of the examples, the particles are embedded in a polymer matrix, and the pressure sensitive material comprises the polymer matrix and embedded particles. Additionally or alternatively to one or more of the examples, when the layer of the pressure sensitive material experiences the deformation, a thickness of the polymer matrix, including the particles, is reduced and the interparticle distance is reduced so as to change the conductivity. Additionally or alternatively to one or more of the examples, the change of the conductivity is based on a quantum mechanical tunneling of electrons from the particle to a neighboring particle via linked ligand molecules. Additionally or alternatively to one or more of the examples, the conductor lines are configured as a comb shape so as to cover substantially an area of the pressure sensitive material. Additionally or alternatively to one or more of the examples, further including a black matrix of a color filter, wherein the conductor lines are configured to conform to a shape of the black matrix. Additionally or alternatively to one or more of the examples, the conductor material is non-transparent. Additionally or alternatively to one or more of the examples, the pressure sensitive material is configured on top of the conductor lines; or the pressure sensitive material is configured under the conductor lines; or the conductor lines are configured within the pressure sensitive material. Additionally or alternatively to one or more of the examples, the layer of the pressure sensitive material and the layer of conductor lines are configured in a back substrate of the display. Additionally or alternatively to one or more of the examples, the pressure sensitive material is non transparent.

Some examples are directed to a method comprising: depositing a layer of pressure sensitive material having particles, wherein a conductivity of the pressure sensitive material is configured to change, when the layer experiences a deformation; and depositing a layer of conductor lines configured to detect the change of the conductivity of the pressure sensitive material, wherein the layer of conductor lines includes a plurality of contacting points with the pressure sensitive material; wherein the layer of pressure sensitive material and the conductor lines are configured to be integrated within a display including a plurality of layers. Additionally or alternatively to one or more of the examples, the step of depositing the layer of pressure sensitive material comprises printing the pressure sensitive material, and the step of depositing the layer of conducting lines comprises printing the conductor lines. Additionally or alternatively to one or more of the examples, further including removing a bottom glass substrate of the display; and adding a plastic substrate to replace the glass substrate, wherein the plastic substrate includes the layer of the pressure sensitive material and the conductor lines.

Some examples are directed to a bendable display module, comprising: a display including a plurality of layers; a layer of pressure sensitive material having particles, wherein a conductivity of the pressure sensitive material is configured to change, when the layer experiences a deformation; and a layer of conductor lines configured to detect the change of the conductivity of the pressure sensitive material, wherein the layer of conductor lines includes a plurality of contacting points with the pressure sensitive material; wherein the layer of pressure sensitive material and the conductor lines are configured to be integrated within the display.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
a display including a plurality of layers;
a layer of pressure sensitive material having particles, wherein a conductivity of the pressure sensitive material is configured to change, when the layer experiences a deformation;
a color filter with a black matrix structure;
a layer of conductor lines configured to operate as a detector of change of the conductivity of the pressure sensitive material, wherein the conductor lines are positioned on top of the black matrix structure, and the pressure sensitive material is deposited on top of the black matrix structure and within the pressure sensitive material; and
wherein the layer of pressure sensitive material, the black matrix structure, and the single layer conductor lines are configured to be integrated within the display.

2. The device of claim 1, wherein the display includes a top layer and a bottom layer, and the layer of the pressure sensitive material and the layer of the conductor lines are laminated between the top and the bottom layer.

3. The device of claim 1, wherein the conductivity of the pressure sensitive material is configured to increase as the layer of the pressure sensitive material experiences the deformation.

4. The device of claim 1, wherein the pressure sensitive material comprises a pressure sensitive ink material.

5. The device of claim 1, wherein the pressure sensitive material comprises a functionalized nanoparticle material, wherein the particles comprise the nanoparticles and ligand molecules.

6. The device of claim 1, wherein the pressure sensitive material is configured to be transparent.

7. The device of claim 1, wherein the particles comprise metallic nanoparticles or semiconductor nanoparticles.

8. The device of claim 1, wherein the particles are embedded in a polymer matrix, and the pressure sensitive material comprises the polymer matrix and embedded particles.

9. The device of claim 1, wherein upon the layer of the pressure sensitive material experiencing the deformation, a thickness of the polymer matrix, including the particles, is reduced and the interparticle distance is reduced so as to change the conductivity.

10. The device of claim 1, wherein the change of the conductivity is based on a quantum mechanical tunneling of electrons from the particle to a neighboring particle via linked ligand molecules.

11. The device of claim 1, wherein the conductor lines are configured as a comb shape so as to cover substantially an area of the pressure sensitive material.

12. The device of claim 1, wherein the conductor lines are configured to conform to a shape of the black matrix structure.

13. The device of claim 12, wherein the conductor material is non-transparent.

14. The device of claim 1, wherein the pressure sensitive material is configured on top of the conductor lines; or the pressure sensitive material is configured under the conductor lines; or the conductor lines are configured within the pressure sensitive material.

15. The device of claim 1, wherein the layer of the pressure sensitive material and the layer of conductor lines are configured in a back substrate of the display.

16. The device of claim 15, wherein the pressure sensitive material is non-transparent.

17. A bendable display module, comprising:
a display including a plurality of layers;
a layer of pressure sensitive material having particles, wherein a conductivity of the pressure sensitive material is configured to change, when the layer experiences a deformation;
a black matrix structure;
a layer of conductor lines configured to operate as a detector of change of the conductivity of the pressure sensitive material, wherein the conductor lines are positioned on top of the black matrix structure and within the pressure sensitive material;
wherein the layer of pressure sensitive material and the conductor lines are configured to be integrated within the display.

18. A device, comprising:
a display including a plurality of layers;
a layer of pressure sensitive material having particles, wherein a conductivity of the pressure sensitive material is configured to change, when the layer experiences a deformation;
a black matrix structure;

a single layer of conductor lines configured to operate as a detector of change of the conductivity of the pressure sensitive material, wherein the single layer of conductor lines includes a plurality of contacting points with the pressure sensitive material, wherein the conductor lines are positioned on top of the black matrix structure and within the pressure sensitive material.

19. The system of claim 18, wherein the layer of pressure sensitive material comprises a printed layer and the conductor lines comprise printer conductor lines.

20. The system of claim 18, further comprising a plastic substrate that includes the layer of the pressure sensitive material and the conductor lines.

* * * * *